Jan. 2, 1951  G. D. HUNTER  2,536,938
ROTARY FLUID MOTOR

Filed Jan. 3, 1947  2 Sheets-Sheet 1

Inventor
George D. Hunter
By Davis & Davis
Attorneys

Jan. 2, 1951     G. D. HUNTER     2,536,938
ROTARY FLUID MOTOR

Filed Jan. 3, 1947     2 Sheets-Sheet 2

Inventor
George D. Hunter
By Davis & Davis
Attorneys

Patented Jan. 2, 1951

2,536,938

UNITED STATES PATENT OFFICE 2,536,938

ROTARY FLUID MOTOR

George D. Hunter, Rocky Mount, N. C.

Original application July 5, 1941, Serial No. 401,248, now Patent No. 2,422,901, dated June 24, 1947. Divided and this application January 3, 1947, Serial No. 720,025

1 Claim. (Cl. 121—90)

This application is a division of my copending application Ser. No. 401,248, filed July 5, 1941, and now U. S. Patent No. 2,422,901 granted June 24, 1947, and relates to improvements in a fluid pressure operated motor of the expansible chamber type.

An object of the invention is to provide an improved fluid pressure operated motor so constructed as to transmit such force by rotary motion to a driven member with a minimum loss through friction.

Another object of the invention is to provide an improved vane type rotary drum motor having apertures formed in the vanes so as to permit the free passage through the vanes of fluid medium entrapped within the revolving drum so as to lessen the counterforce of such fluid within the drum which would otherwise tend to retard the rotary movement thereof.

These and other objects and features of the invention are pointed out in the following description in terms of the embodiment thereof which is shown in the accompanying drawings. It is to be understood, however, that the drawings are for the purpose of illustration only, and are not designed as a definition of the limits of the invention, reference being had to the appended claim for this purpose.

Figure 1:
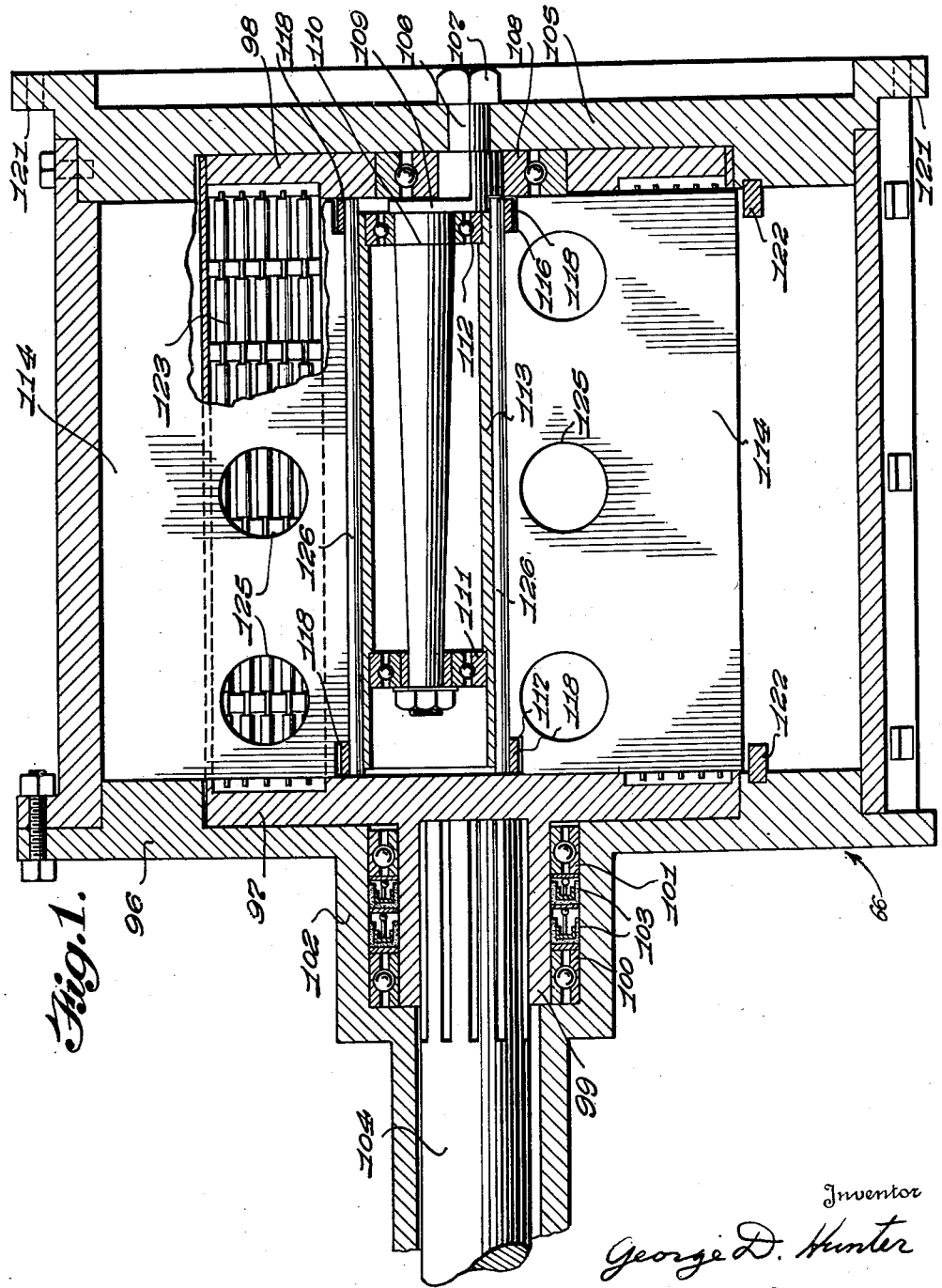
Figure 1 is a transverse sectional view of the motor taken along the lines 2—2 of Figure 2 and looking in the direction of the arrows.
Figure 2:
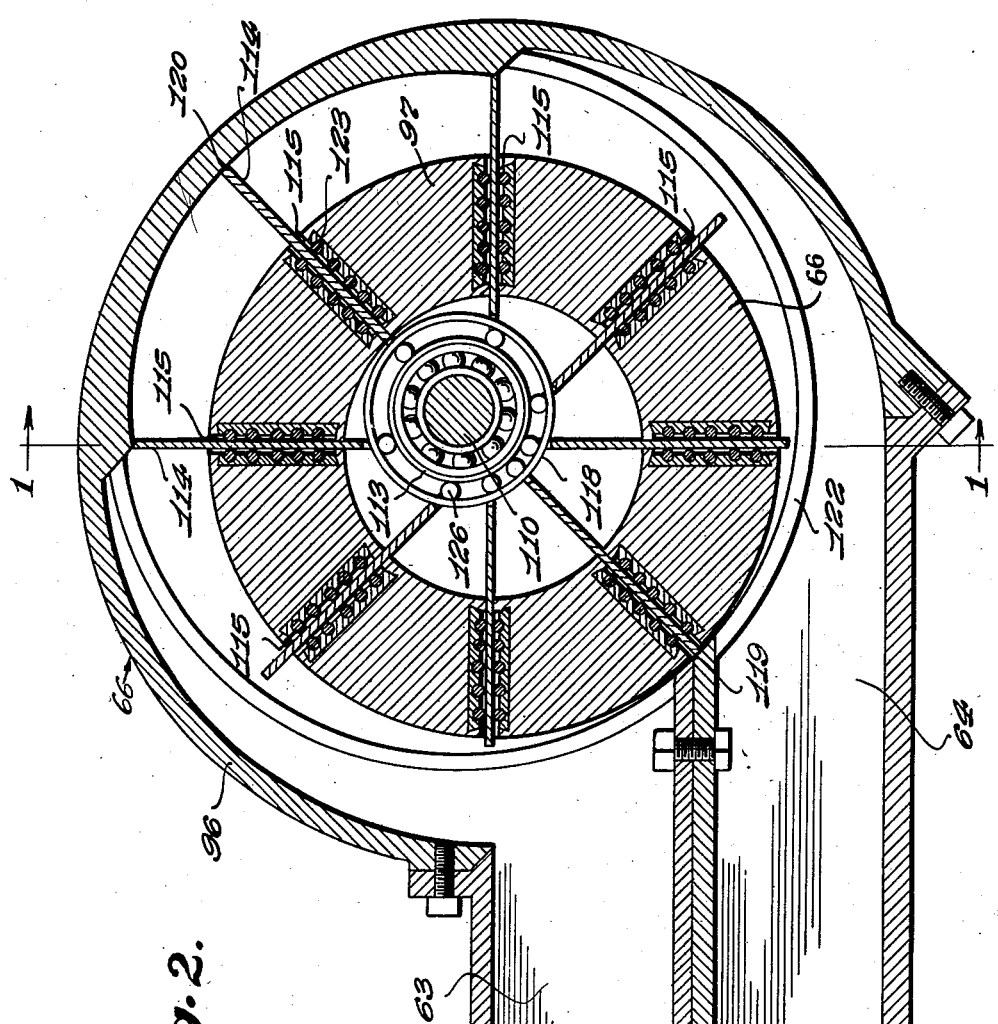
Figure 2 is a sectional view of Figure 1 and illustrating the operation of the motor vanes in the rotary drum.

My invention embodies improvements in a motor 66 as disclosed in Figures 1 and 2 having fluid pressure inlet and outlet conduits 63 and 64.

The motor 66 is composed of a housing 96 in which is mounted a spider drum or rotary driven unit 97. The spider drum 97 is a slotted cylinder having one end closed by the end plate 98, Figure 1, and the other end formed integral with the cylinder. The latter end of the said drum 97 has provided a sleeve 99 which is mounted on the bearings 100 and 101 in a sleeve 102 of the housing 96. Between the bearings are provided oil retainers 103 constructed the same as the oil retainers of the rotary pump described in my U. S. Patent No. 2,422,901. Sleeve 99 is splined or fastened in any convenient manner to a driven axle 104.

There is rigidly fastened to an opposite wall 105 of the housing 96 a shaft 106 which is splined to the said wall 105 and fastened by a nut 107. The spider drum 97 is rotatably mounted on a bearing 108 provided on the said shaft 106. Further there is rigidly mounted at the inner end of the said shaft 106 an arm 109 to which there is attached off center from the center of the said drum 97 and the said shaft 106 a spindle 110 on which there are mounted at the opposite ends thereof bearings 111 and 112 on which is rotatably mounted a sleeve 113. The off center sleeve 113 serves as a cam means to force vanes 114 of the spider drum 97 outward through slots 115 as the spider drum revolves, Figure 2.

The vanes 114 as shown in Figures 1 and 2 have provided at the inner end thereof members 126 and slots 116 and 117 in which are positioned retainer or guide rings 118. There are journaled in the guide rings 118 the members 126 of the said vanes 114. The guide rings 118 serve to hold the members 126 and the vanes 114 always in contact with the cam sleeve 113 which revolves on the spindle 110 with the vanes 114 and spider drum 97 so as to thereby reduce friction to a minimum.

Thus it will be readily seen that as the spider drum revolves, each of the said vanes 114, as the same move from the wall 119, will be forced by the cam sleeve 113 outward through the slots 115 until the vane approaches a point diametrically opposite the wall 119 and indicated in Figure 2 by the numeral 120 at which point this outward cam action ceases.

Then guide ring 118 positioned around the cam sleeve 113 and the members 126 of the vanes 114 causes the said vanes 114 as it passes this point 120 to slide inwardly as the drum 97 continues to revolve, until the said vane is flush with the outer surface of the drum 97 at the wall 119. The wall 119 serves as the dividing wall between the channels 63 and 64. Thus the sliding vanes serve as a valve closing the opening between the spider drum 97 and the housing 96, against which the fluid medium entering through channel 63 or 64 will be forced causing the spider drum 97 and its connected parts to revolve turning the driven axle. Furthermore, by retracting the said vanes when past the point of force, point 120, the fluid medium is released and allowed to pass outward through the outlet channel. There is further provided a rib 122, Figures 1 and 2, to prevent jamming should any of the spider vanes 114 become accidentally disengaged from the ring 118.

The spider vanes 114 are slidably mounted between rollers 123 as shown in Figures 1 and 2 so as to reduce friction. The operation and construction of which is clear from the drawings thereof without the necessity of further description.

Adding to the efficiency of the motor 66 are apertures 125 provided in the vanes 114 near the inner end thereof. The said apertures 125 allow for the free passage through the vanes 114 of any fluid medium within the revolving spider drum 97 thereby lessening any pressure which may be created within the revolving drum 97 which would otherwise retard the rotary action of the said drum 97.

Although only one embodiment of the invention has been illustrated and described, various changes in the form and relative arrangement of the parts, which will now appear to those skilled in the art, may be made without departing from the scope of the invention. Reference is, therefore, to be had to the appended claim for a definition of the limits of the invention.

What is claimed is:

In a motor of the class wherein there is provided a casing, a rotary drum mounted within the casing, and a radially projecting vane slidably mounted in the drum, characterized by the fact that there is combined with the vane a spindle mounted within the drum and the spindle having a first portion fixedly positioned eccentric from the center of rotation of the drum, a sleeve, roller bearings to rotatably support the sleeve on the first portion of the spindle, the spindle having a second portion thereof concentric with said drum, other roller bearings to rotatably support the drum on the second portion of the spindle, a member fastened to the inner end of the vane, a guide ring separate from the sleeve mounted around the end member and the sleeve, and the guide ring adapted to slidably hold the end member in engaging relation with the sleeve, whereby the vane is slidably forced in and out of the drum as the drum revolves.

GEO. D. HUNTER.

REFERENCES CITED

The following references are of record in the file of this patent:

UNITED STATES PATENTS

| Number | Name | Date |
|---|---|---|
| 125,748 | Massey | Apr. 16, 1872 |
| 1,616,285 | Stern | Feb. 1, 1927 |
| 2,071,799 | Mabille | Feb. 23, 1937 |
| 2,097,718 | Bilderbeck | Nov. 2, 1937 |
| 2,312,961 | Cowherd | Mar. 2, 1943 |